US009740454B2

United States Patent
Rozario

(10) Patent No.: US 9,740,454 B2
(45) Date of Patent: *Aug. 22, 2017

(54) CROSSING PIPELINED DATA BETWEEN CIRCUITRY IN DIFFERENT CLOCK DOMAINS

(71) Applicant: Imagination Technologies Limited, Kings Langley (GB)

(72) Inventor: Ranjit J. Rozario, Sunnyvale, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,177

(22) Filed: May 9, 2016

(65) Prior Publication Data

US 2016/0253151 A1 Sep. 1, 2016

Related U.S. Application Data

(63) Continuation of application No. 14/451,279, filed on Aug. 4, 2014, now Pat. No. 9,367,286.

(60) Provisional application No. 61/919,695, filed on Dec. 20, 2013, provisional application No. 61/870,919, filed on Aug. 28, 2013.

(51) Int. Cl.
G06F 13/00 (2006.01)
G06F 13/42 (2006.01)
H04L 7/00 (2006.01)
G06F 5/06 (2006.01)
G06F 15/00 (2006.01)

(52) U.S. Cl.
CPC ............. *G06F 5/06* (2013.01); *G06F 13/00* (2013.01); *G06F 15/00* (2013.01)

(58) Field of Classification Search
CPC ............. G06F 5/06; G06F 13/00; G06F 15/00
See application file for complete search history.

(56) References Cited

U.S. PATENT DOCUMENTS

| 5,758,131 | A | 5/1998 | Taylor |
| 6,000,037 | A | 12/1999 | Herbert |
| 6,434,684 | B1 | 8/2002 | Manning |
| 8,898,503 | B2 | 11/2014 | Dreps et al. |
| 9,367,286 | B2 * | 6/2016 | Rozario .................. G06F 5/06 |
| 2004/0151209 | A1 | 8/2004 | Cummings et al. |

(Continued)

*Primary Examiner* — Mark Connolly
(74) *Attorney, Agent, or Firm* — Vorys, Sater, Seymour & Pease LLP; Vincent M DeLuca

(57) ABSTRACT

An integrated circuit implements a multistage processing pipeline, where control is passed in the pipeline with data to be processed according to the control. At least some of the different pipeline stages can be implemented by different circuits, being clocked at different frequencies. These frequencies may change dynamically during operation of the integrated circuit. Control and data to be processed according to such control can be offset from each other in the pipeline; e.g., control can precede data by a pre-set number of clock events. To cross a clock domain, control and data can be temporarily stored in respective FIFOs. Reading of control by the destination domain is delayed by a delay amount determined so that reading of control and data can be offset from each other by a minimum number of clock events of the destination domain clock, and control is read before data is available for reading.

15 Claims, 6 Drawing Sheets

(56) References Cited

U.S. PATENT DOCUMENTS

2008/0244299 A1 10/2008 Tune et al.
2009/0240969 A1 9/2009 Chiu et al.

* cited by examiner

CROSSING PIPELINED DATA BETWEEN CIRCUITRY IN DIFFERENT CLOCK DOMAINS

CROSS REFERENCE TO RELATED APPLICATIONS

This application claims priority from U.S. Provisional Patent Application No. 61/870,919, filed on Aug. 28, 2013 and 61/919,695, filed on Dec. 20, 2013, both entitled "Crossing Pipelined Data between Circuitry in Different Clock Domains" and incorporated herein by reference in their entireties for all purposes.

BACKGROUND

Field

The following relates to integrated circuits, and more particularly to integrated circuits that have multiple clock domains.

Related Art

Synchronous digital circuits use clock signals to synchronize pieces of circuitry that propagate data. For example, a stage in a pipelined processor may include some combinatorial logic that uses inputs from a set of latches, which are clocked by a clock for the clock domain in which the combinatorial logic exists, and outputs data which is latched by another set of latches that feeds a subsequent pipeline stage. A complex integrated circuit may contain multiple clock domains, each with circuitry synchronized to a clock in that clock domain. Multiple clock domains present an opportunity to more granularly adjust operating frequency of different portions of a complex integrated circuit, by independently varying clock frequencies in different clock domains. A principal reason for adjusting clock operating frequency is to opportunistically reduce power consumption. However, considerations relating to maintaining correctness of operation and other optimizations arise when implementing such dynamic clock frequency adjustments.

SUMMARY

One aspect relates to a method of crossing pipelined control and data between clock domains in a multi-clock domain integrated circuit. A first circuit, clocked by a first clock, stores an element of control information in a control queue. Subsequently, the first circuit stores an element of data in a data queue, after a delay characterized by a pre-set number of clock events of the first clock. A counter is initialized to an initial value and updated based on the first clock. A signal is generated responsive to the counter reaching a final value. The counter is set to a value that indicates that the element of control information can be read from the control queue by a second circuit, which is clocked by a second clock, operating at a different frequency than the first clock, and also that the second circuit can read the element of data from the data queue, after the pre-set number of clock events have occurred for the second clock since the control information was read.

The initializing of the counter may involve setting the counter to an initial value determined according to a ratio of the first clock and the second clock and the pre-set number of clock events (a "pipeline delay"). The counter may be initialized so that responsive to the counter reaching zero, or transitioning from 1 to 0, the generating of the signal can be performed. The updating of the counter may comprise decrementing the counter for each clock event of the first clock.

Another aspect comprises an integrated circuit for performing an implementation of the described method. Another aspect comprises a machine readable medium, which can be non-transitory, for storing machine readable data for constructing an integrated circuit that can perform an implementation of the method. The above gives a short summary of some aspects related in detail below. As such, this summary is not limiting, but rather provides a general overview of subject matter described in detail below.

BRIEF DESCRIPTION OF THE DRAWINGS

The accompanying drawings, which are incorporated herein and form part of the specification, illustrate the present invention and, together with the description, further serve to explain the aspects of the disclosure of the invention and to enable a person skilled in the pertinent art to make and use the invention.

DETAILED DESCRIPTION

Some aspects relate to integrated circuits that have multiple clock domains, driven by clocks that can have dynamically variable operating frequency ratios. For example, some implementations of the disclosed technology include functional units that process information in a pipelined fashion and have multiple clock domains internal to a functional unit, at boundaries between functional units, or both. For the purposes of this disclosure, a relevant consideration arises where a source portion of circuitry is driven by one clock and a sinking portion of circuitry by a different clock. The source portion is configured to output two or more items of data (e.g., control or configuration data as one item and operand data as another item), that have a temporal offset from each other, which is controlled by a number of clock events of the clock for the source portion, to the other portion of circuitry, where the items of data are to maintain the same clock count offset. In one example, control information and data are passed through pipeline stages, where the control information leads the data by a pre-set number of clock events and is used to configure hardware elements to perform a specified operation or operations on (or with) the data associated with that control information.

Figure 1:
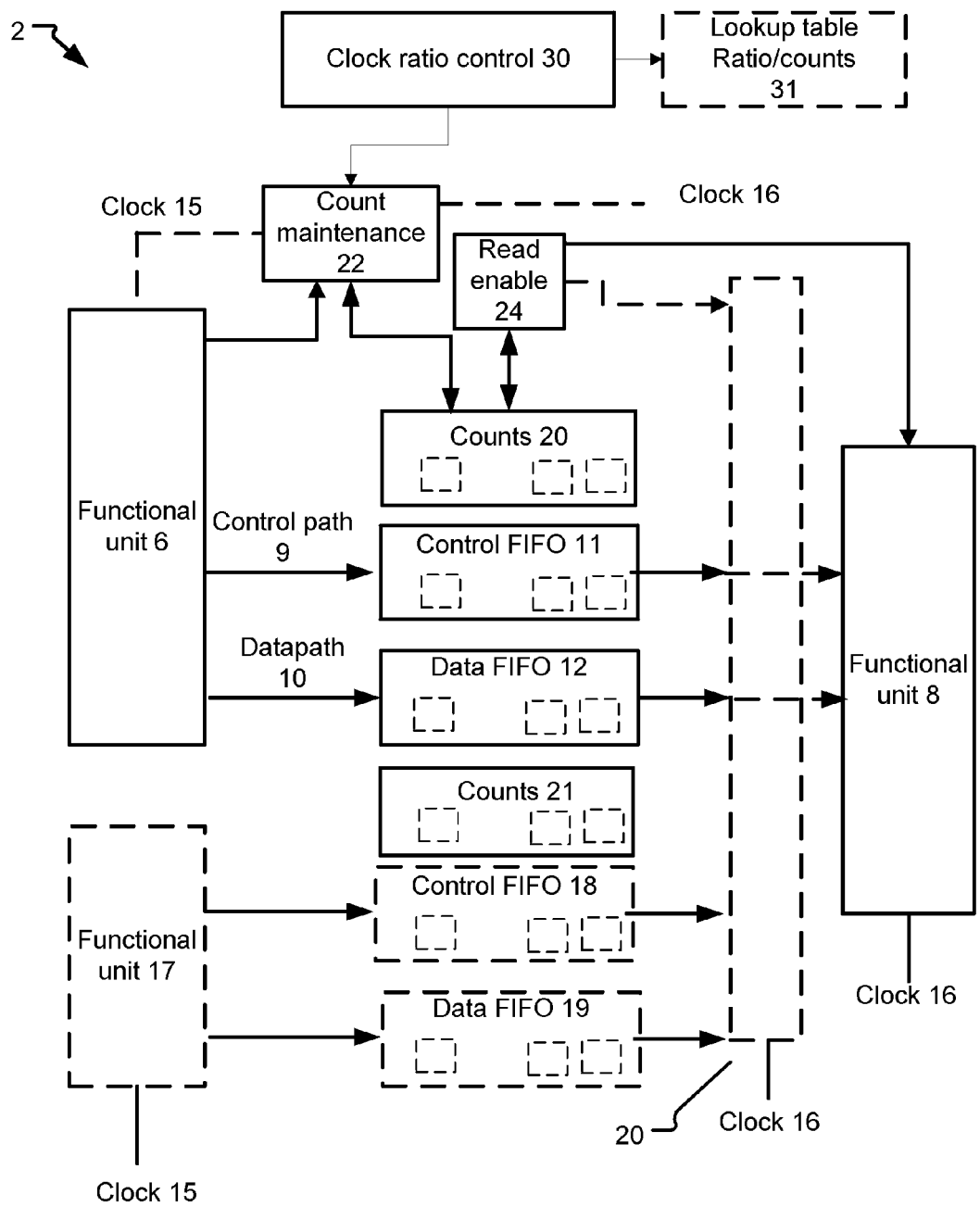
FIG. 1 depicts an example integrated circuit having multiple clock domains, in which aspects of the disclosure can be implemented.

As a more specific example, FIG. 1 depicts an integrated circuit 2 having functional units 6 and 8. Functional units 6 and 8 represent an example where a portion of circuitry may be delineated to implement a particular operation or operations. Examples of functional units include a floating point unit, an adder, a complex function unit, an Arithmetic Logic Unit (ALU), a memory management unit, and so on. Functional unit 17 is optionally present, and relates to the example of FIG. 4, described below. A clock ratio control element 30 is coupled with a lookup table 31 that maintains an appropriate initial value for counters, described below, for each operating mode of an interface between functional unit 6 and functional unit 8 depicted in FIG. 1 (described in more detail below.)

Functional unit 6 is clocked by a clock 15 and functional unit 8 is clocked by a clock 16; optional functional unit 17 also is clocked by clock 15 in this example. Functional unit 6 outputs control information on control path 9, to a control FIFO 11. Functional unit 6 outputs data on datapath 10 to a data FIFO 12. Functional unit 17, if present, outputs control to control FIFO 18 and data to data FIFO 19. These FIFOs can be read by a bus interface unit 20, if present. If a bus interface unit is not present, then functional unit 8 can directly read from these FIFOs. For example, the FIFOs can be part of a point to point connection between functional unit 6 and functional unit 8. In other implementations, FIFOs may be used as inputs to control and data busses. The examples here show that control and data can be signaled separately. However, those of ordinary skill may adapt these disclosures to make implementations that use a single physical bus for both control and data. The bus 20 and functional unit 6 may be clocked by clock 16.

As introduced above, functional unit 8 (where bus 20 is not present) is operable to read from control FIFO 11 and data FIFO 12. A series of control elements (portions of control data that each have associated data) may be processed in pipeline fashion through functional unit 6, which establishes a correct relative order in which processing is to be performed by the portions of integrated circuit 2 involved in that pipeline. The control and paired data in the pipeline are offset from each other by a pre-set number of clock events of clock 15. This offset can be pre-determined for a specific implementation. The offset can also vary for different transaction types. The offset may be dependent on considerations such as an amount of latency between functional units 6 and 8 and a baseline clock rate. Thus, when pipelined processing is performed by circuitry located in two different clock domains (as in the example of FIG. 1), this offset, measured in a number of clock events, between control and paired data should be maintained, so that the correct control is applied to the appropriate data.

In one aspect of the disclosure, in order to maintain correctness of order and the appropriate pipeline offset, integrated circuit 2 includes a count maintenance circuit 22 that also is clocked by clock 15. Count maintenance circuit 22 receives signal(s) 18 from functional unit 6, indicating that control/data is being outputted by functional unit 6 on control path 9 and datapath 10 (an example of such signal(s) is detailed below). Count maintenance 22 initializes and maintains a counter in a counts module 20. A read enable module 24 tracks a current status of counts module 20, and generates a read enable signal provided to functional units that read from control FIFO 11 and data FIFO 12 (e.g., functional units 8 and 32). FIG. 1 depicts that count maintenance 22 can be clocked by one or more of clock 15 and clock 16. Implementations may determine to use either the source module clock (e.g., clock 15) or the destination module clock (clock 16). In some situations, an entirely different clock could be used. For example, if clock 15 and clock 16 are derived from a common clock with a known frequency relative to clocks 15 and 16, then clock maintenance 22 can use that common clock to maintain the counters. In such a circumstance, an initial value to which a given counter is initialized is determined according to how that counter will be maintained.

In one implementation, there is a counter for each element of control currently in control FIFO 11. A maximum number of items that may be in control FIFO 11 at a given time is related to an amount of offset between the control and data in the pipeline being implemented in this portion of integrated circuit, and to a difference in speed between clock 15 and clock 16. In one example, count maintenance 22 initializes a respective counter for each item of control stored in control FIFO 11, in response to each write enable signal from functional unit 6, and maintains all active counters in counts 20 for each clock event occurring for clock 15.

As an example, each count may be initialized to a particular value calculated based on a current ratio between clock 15 and clock 16, and the offset between control and data. In one example, the initial value is determined so that a read of the control information by functional unit 8 is delayed until the control information is available, but ahead of availability of the paired data in data FIFO 12. In one example, control FIFO 11 is read at a time so that the data paired with that item of control will be available for reading by functional unit 8 after a number of clock events of clock 16 equal to the pipeline offset has occurred. Read enable 24 may comprise a set of comparators that compares a trigger value (e.g., 0) to each of the active counters in counts 20, and generates a read enable signal for a particular item of control, in response to the counter initialized for that item of control reaching that trigger value. A more detailed example of operation of the various components depicted in FIG. 1 is found below.

Figure 2:
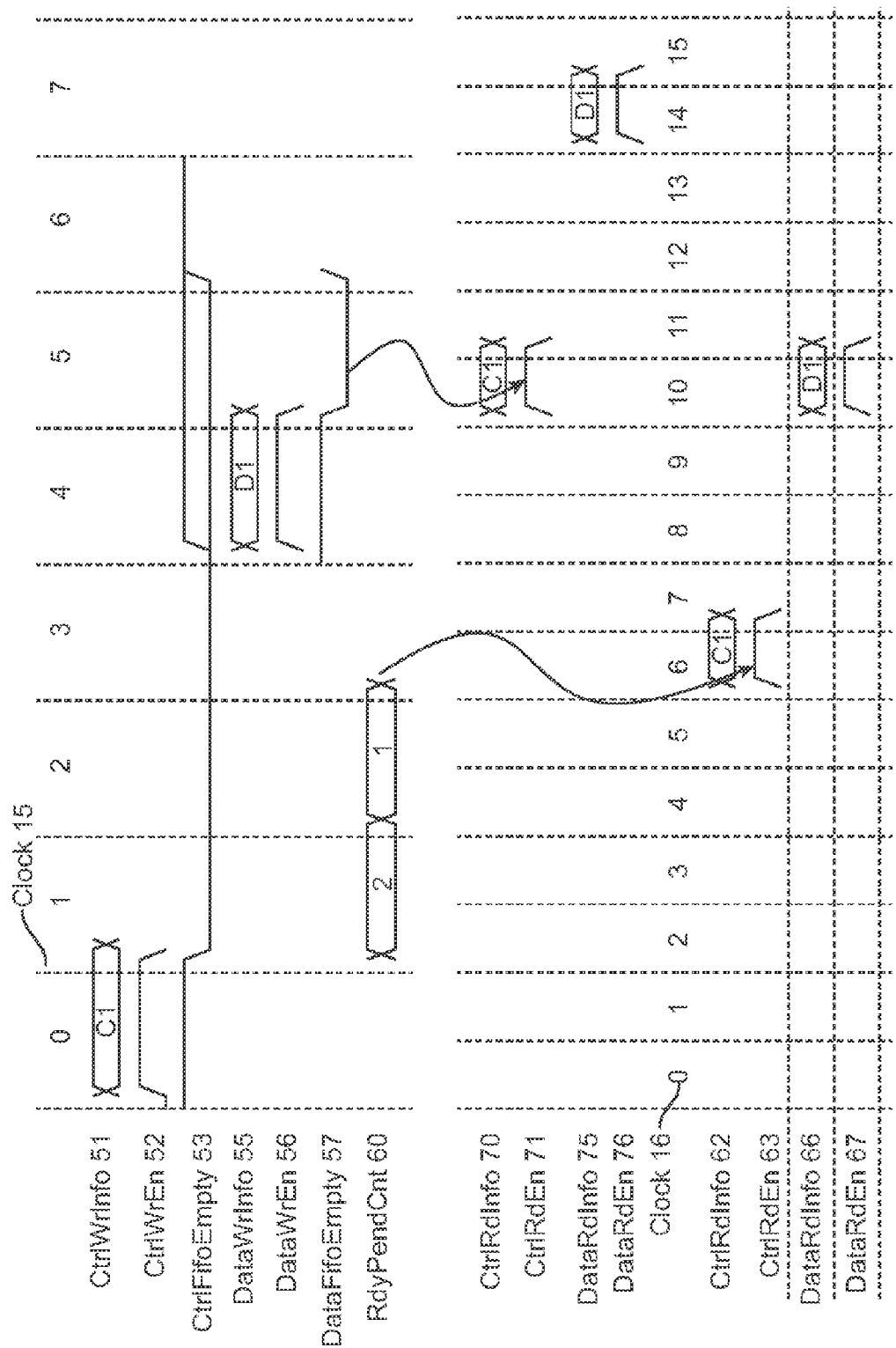
FIG. 2 depicts a first example timing diagram in which control and data cross a clock domain boundary with a 2:1 clock ratio, are offset in a pipeline by four clock events, and each transaction includes a single data element.

FIG. 2 depicts a timing diagram for an example set of signals implementing the aspects of integrated circuit 2 disclosed above. In the example of FIG. 2, clock 16 operates at double the frequency of clock 15, and is configured for a pipeline offset where data trails control by four clock events. At clock event 0 of clock 15, a CtrlWrInfo signal 51 (CtrlWrInfo 51) is generated to output control information on control path 9. A CtrlWrEn signal 52 can be used to indicate that such control information is available to be latched into control FIFO 11. At clock event 4 of clock 15, data corresponding to the control written at clock event 0 is put on datapath 10 (DataWrInfo 55, DataWrEn 56 and DataFifoEmpty 57 being used to implement), and ultimately stored in data FIFO 12.

CtrlWrEn 52 also can be used as the signal to initialize a counter for the item of control to be written to control FIFO 11. A CtrlFifoEmpty signal 53 can indicate that the control FIFO 11 is not empty. A RdyPendCnt signal 60 can be used to represent a current status of the counter initialized for the item of control. FIG. 2 shows that RdyPendCnt 60 is initialized at 2 and decremented for each clock event of clock 15. A transition from a count of 1 to 0 initiates a CtrlRdInfo signal 62 and a CtrlRdEn signal 63, which are used to indicate that the control item is ready to be read by functional unit 8 being clocked by clock 16. Functional unit 8 should maintain the four clock-event delay between CtrlWrInfo 51 and DataWrInfo 55 in clock 15 when reading control FIFO 11 and data FIFO 12. Since functional unit 8 is clocked by clock 16, which operates at twice the frequency of clock 15, control FIFO 11 can be read by functional unit 8 at clock event 6 and data FIFO 12 can be read at clock event 10 for clock 16. A DataRdInfo 66 signal and a DataRdEn signal 67 can be triggered at clock event 10 for clock 16 by a state machine or other state tracking mechanism in functional unit 8, which maintains the four clock event delay for the pipeline.

The example depicted in FIG. 2 was for a situation where control leads data by four clock events of the clock used in a source part of the pipeline (exemplified by functional unit 6), and that clock is half the frequency of a sink part of the pipeline (exemplified by functional unit 8). However, a pipeline delay of 4 clock events for clock 15 translates into 8 clock events for clock 16. Such a ratio can change as the frequencies of one or more of clock 15 and clock 16 change. Functional unit 8 cannot rely on CtrlFifoEmpty 53 as a signal to read from control FIFO 11, which would in turn trigger the four-clock event offset of the pipeline, because a four-clock event delay of clock 16 may be insufficient to allow the data to be available to be read from data FIFO 12.

One way to safely ensure that functional unit 8 can read data FIFO 12 exactly four clocks after reading control FIFO 11 is to trigger reading of control FIFO 11 based on the availability of data in data FIFO 12. This approach is shown by a CtrlRdInfo signal 70 and a CtrlRdEn signal 71 being triggerd by DataFifoEmpty 57. As would be expected, in such scenario, a DataRdInfo signal 75 and a DataRdEn signal 76 are activated four clock events after CtrlRdEn 71. However, in this situation, this pairing of control and data is not fully available to functional unit 8 until clock event 15 of clock 16, which is 4 clock events later than the embodiment described above. As would be appreciated, the extra number of clock events spent in functional unit 8 waiting for data availability would increase proportionally as pipeline offset increases. Therefore, such an approach induces delay at the transition between functional units 6 and 8.

Implementations of the disclosure may provide an optimal transition between functional units 6 and 8, in that control is read by functional unit 8 at a time that allows the appropriate number of clock events to occur (to maintain the pre-set pipeline offset), and to have that number of clock events coincide with availability of data to be read from data FIFO 12. By specific contrast, in FIG. 2, data FIFO 12 is read on clock event 10 according to such an approach, rather than at clock event 14, resulting in reduced delay.

Figure 3:
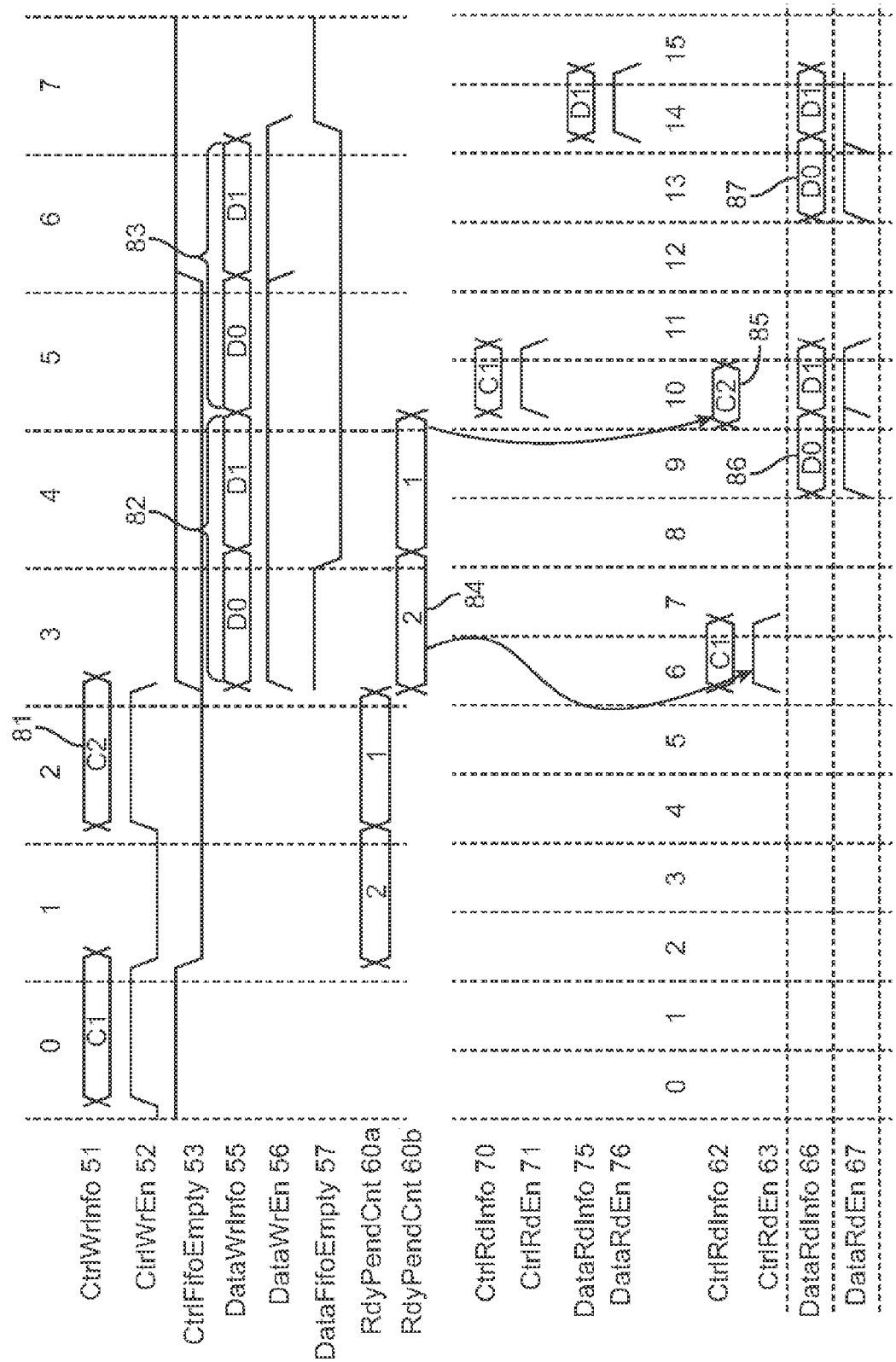
FIG. 3 depicts a second example timing diagram in accordance with FIG. 2, except that each transaction includes two data elements.

FIG. 3 presents an additional example to further elucidate aspects that may be found in implementations of the disclosure. FIG. 3 shows a second transaction, having a CtrlWrInfo transaction at clock event 2 (identified as 81). FIG. 3 also shows that each transaction comprises two "beats" of data, identified for each transaction 82 and 83 as D0 and D1 (as shown by DataWrInfo 55 at clock events 3-6). In FIG. 3, CtrlRdInfo 62 is in accordance with the example of FIG. 2. A counter 84, for which a current value is represented by RdyPendCnt 60b, is set responsive to the second control element 81. The initial value for such counter, and expiration of that counter triggers the second instance of CtrlRdInfo (85 in FIG. 3). The DataRdInfo 66 signals are identified as 86 and 87, and include two beats of data.

The example of FIG. 3 shows that each beat of data can be stored in a respective location in the FIFO (i.e., that the reading of the data does not need to occur during a valid period when the data is being written to a FIFO). For example, FIFO 12 can operate to store consecutive beats of data in consecutive FIFO locations. An amount of data stored in a given FIFO location may be selected according to a width (number of bits) of the data being stored. For example, a datapath can be 8, 16, 32, 64, 128, 256 bits, or more wide. A FIFO can allocate an appropriate number of slots to receive the data to be made available in a transaction. For example, in FIG. 2, only one FIFO slot is needed, while in FIG. 3, two FIFO slots may be reserved. In FIG. 3, because the pipeline delay is 4 clocks, the second control element occurs at clock 2, skipping a clock from the first CtrlWrInfo 51 at clock 0 (where there is a single write port to FIFO 11 from functional unit 6).

Figure 4:
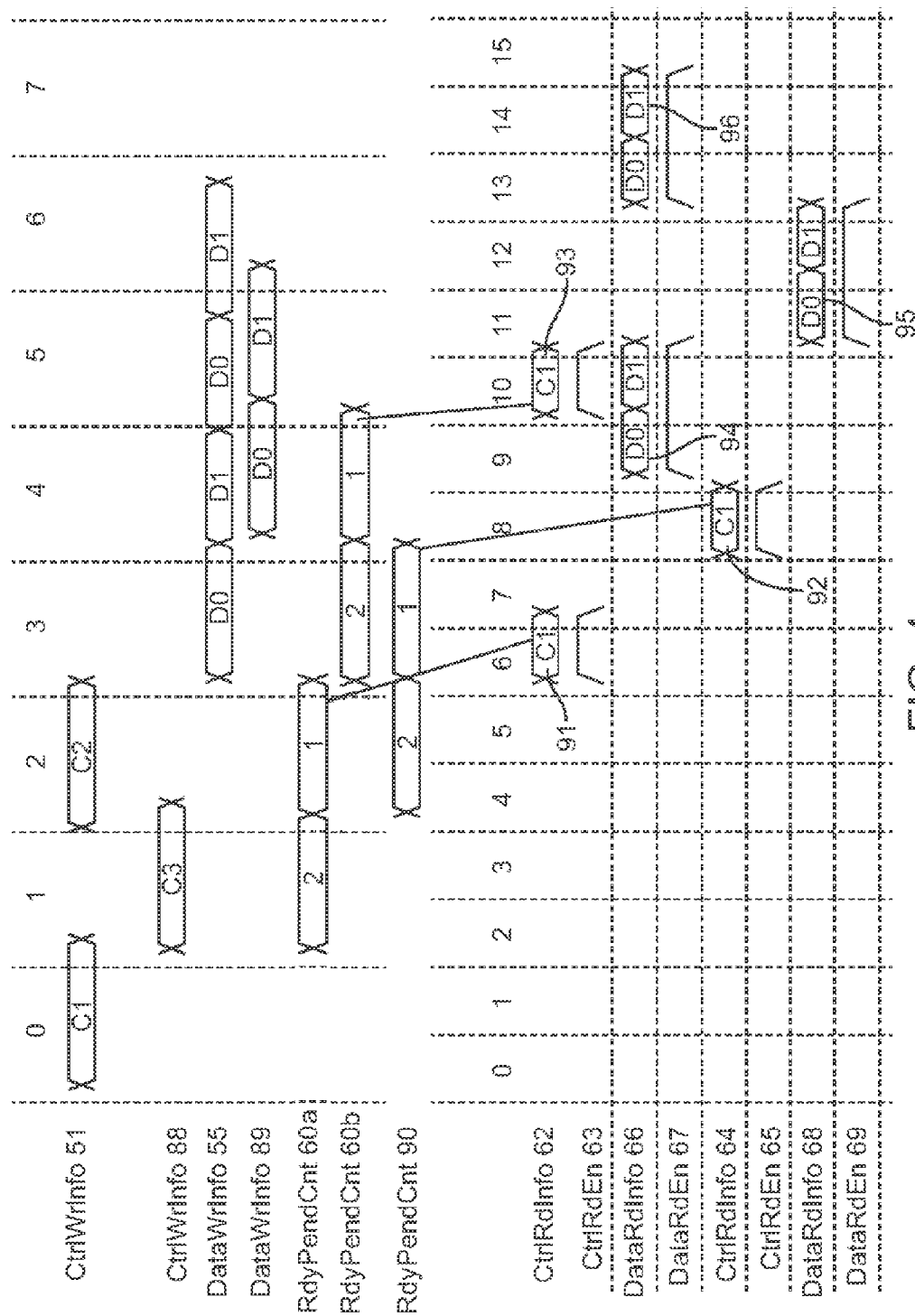
FIG. 4 depicts a second example timing diagram in accordance with FIG. 3, except that multiple sources are multiplexed from slow-clock sources onto a fast clock domain.

FIG. 4 depicts an example that builds on the example of FIG. 3, where multiple sources of control and data are multiplexed on the faster clock ratio side (e.g., on bus 20 of FIG. 1). In the example of FIG. 4, CtrlWrInfo 51, RdyPendCnt 60a, and RdyPendCnt 60b are as in FIG. 3, and a second CtrlWrInfo 88 and RdPendCnt 90 is provided. These can be implemented for Control FIFO 18 and Data FIFO 19 that interface functional unit 17 with bus 20, for example. Counts 21 provide a per-transaction counter for each transaction represented in control FIFO 18 and data FIFO 19. In FIG. 4, CtrlWrInfo 88 becoming active, causing initialization of a counter (represented by RdPendCnt 90). RdyPendCnts 60a, 60b and 90 decrement according to Clock 15, in an example. FIG. 4 shows that functional units 6 and 17 would coordinate to alternate with each other (or one unit can be offset in operation from the other by a clock event), in generating transactions (see CtrlWrInfo 51 transactions at clocks 0 and 2, with CtrlWrInfo 88 at clock 1). The availability of data would be as shown in FIG. 4, maintaining a four clock pipeline delay for each of functional unit 6 and functional unit 17. CtrlRdInfo 62 can become active as shown. A second CtrlRdInfo 64 can be used to signal when to read from Control FIFO 18 (CtrlRdEn 65 shown also), as indicated by reference 92. DataRdInfo 66 can be active as depicted, and a second DataRdInfo 68 can be used to indicate when Data FIFO 19 should be read, DataRdEn 69 also is depicted, at reference 95. FIG. 4 thus shows how multiple sources can be multiplexed onto a faster bus or multiplexed into one functional unit, where each reading of control is triggered by an expiration of a counter for that transaction. Thus, in an example of FIG. 4, two sources of data each operating at a slower clock rate can be combined into a higher bandwidth channel, while maintaining appropriate pipeline delays between reading of control and data.

Figures 5A, 5B:
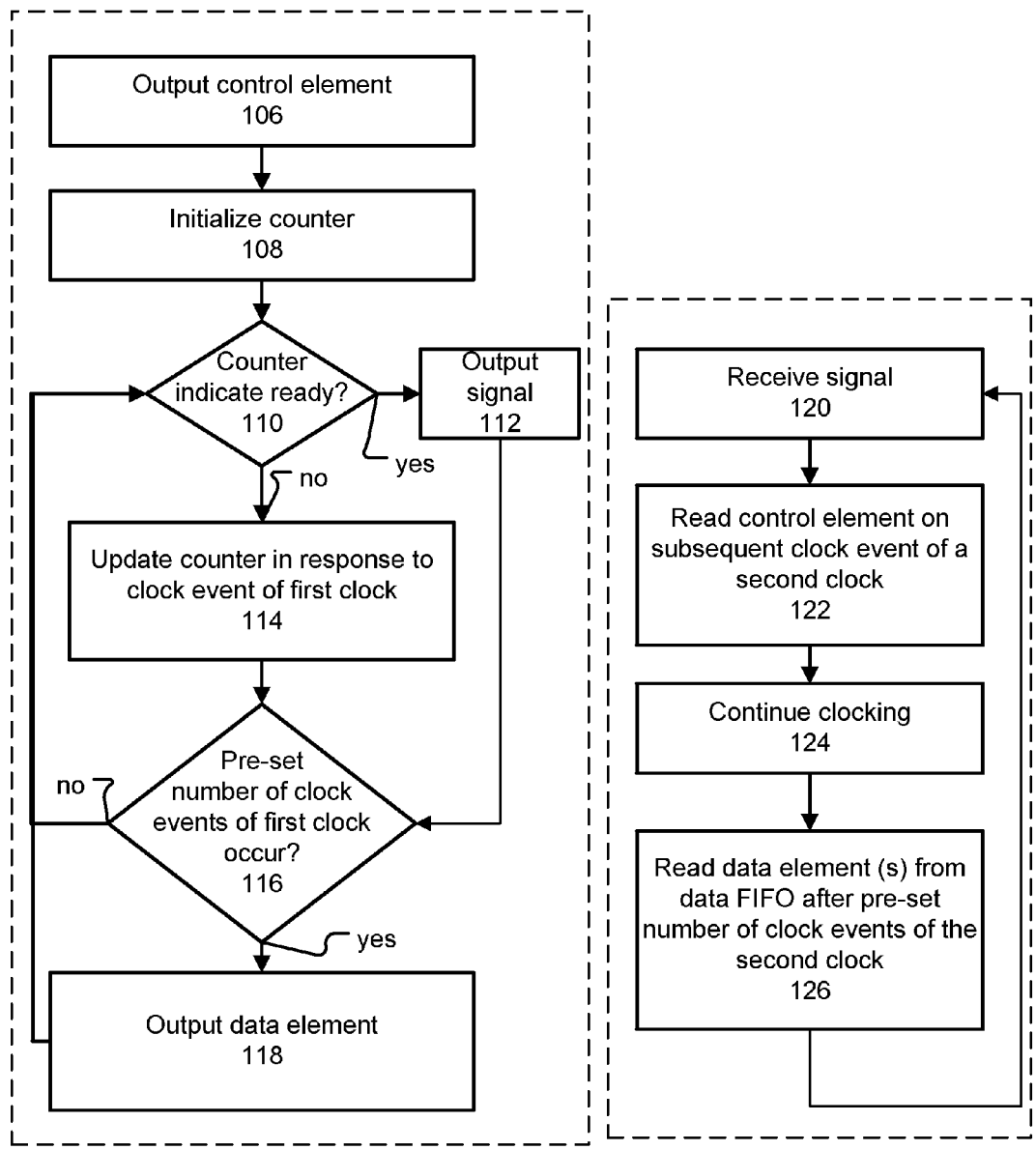
FIGS. 5A and 5B depict an example process by which implementations can operate.

FIGS. 5A and 5B depict aspects of an exemplary method, which can be implemented within an integrated circuit according to the disclosure. At 106, an element of control is output (e.g., from a source circuit) and at 108, a counter is initialized. At 110, a decision whether the counter indicates that the item of control is ready to be read is made, and if not, then at 114, the counter is updated in response to a clock event of a first clock (e.g., a clock for the source circuit). At 116, if a pre-set number of clock events of the first clock have occurred, then at 118, a data element is output (e.g., output to a data FIFO by the source circuit). After 118 and 116, the method of FIG. 4A can continue at 110, where it is again determined whether the counter indicates readiness to generate the signal. Here, decision 110 can be implemented, for example, as a comparison between a current value of the counter and a pre-determined value, such as 0. Such comparison may be implemented in a fixed-function circuit. Such comparison also may be implemented using programmable or configurable logic elements. For example, the updating of the counter and the comparison may be implemented within the same circuit. As such, the disclosure does not imply, by separately depicting certain actions, that these actions necessarily are conducted separately from each other or by different logic elements.

Returning to 110, if the counter indicates readiness (is interpreted as indicating readiness), then at 112, a signal is output. Turning to FIG. 4B, at 120, that signal is received, and in response, at 122, an element of control is read at a time determined by a clock event of a second clock (e.g., read by a sinking circuit, that is clocked by a second clock). At 124, the second clock continues (concurrently with clocking of the first clock). At 126, the data element outputted to the data FIFO at 118 is read after the pre-set number of clock events of the second clock. Following the reading at 118, the method of FIG. 4B can return to 120, and await receipt of another signal. This approach may be implemented where a comparatively long signal latency (long signal latency compared to a clock period) exists between functional units 6 and 8. Here, the expiration of a counter signals to begin reading from the control FIFO(s) and does not require a round trip communication.

In the example of FIG. 2 above, a single data transaction was shown. In the examples of FIGS. 3 and 4, two data elements accompanied a single element of control. However, implementations also may allow more data elements, and a variable number of data transactions for each item of control. For example, a series of data elements can each by processed in a stream using the same control. For example, such a pipeline could process a variable number of data elements, determined by how long DataFifoEmpty 57 was held low, meaning that the data FIFO 12 is not yet empty. During that period, data can be continuously clocked from data FIFO 12. A state machine or other state tracking mechanism in the pipeline would be adapted to implement this approach. This approach is in contrast to the examples of FIGS. 2-4, in which all the data elements for a given element of control were available within a known maximum pipeline delay, and for a given transaction format, a pre-determined number of data items would be present in each transaction. These two parameters allow a state machine in functional unit 8 to begin reading from data FIFO 12 at an appropriate time after reading from control FIFO 11, so that the transaction completes within the pre-defined pipeline delay.

Figure 6:
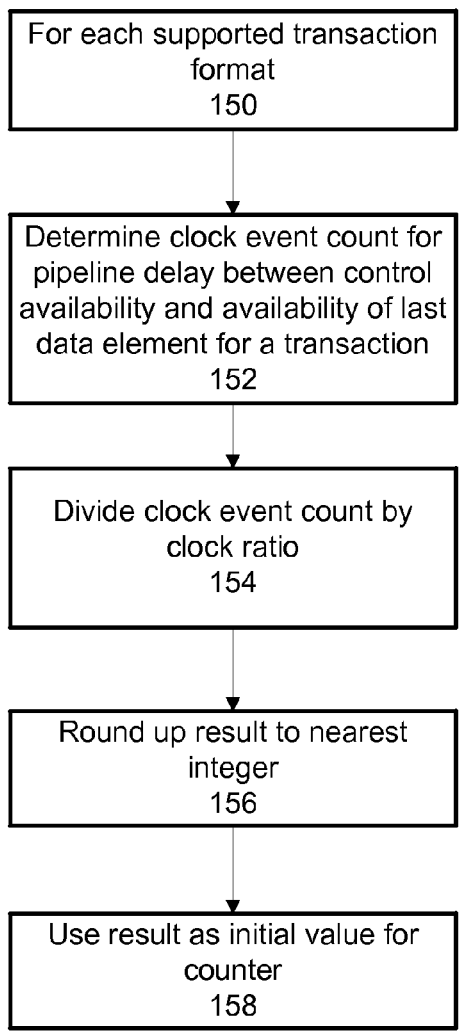
FIG. 6 depicts an example approach to determining an initial value for the counter according to different supported transaction types.

FIG. 6 depicts an approach to determining the initialized clock values. As shown at 150, the depicted approach may be repeated for each transaction format to be supported. Transaction formats may vary a clock ratio, or a number of data elements for each control element, for example. Transaction formats also may vary a delay between control and data. Different implementations may support different pre-determined sets of transaction formats. An available set of transaction formats may be pre-determined for a particular implementation.

Where pipeline latency is specified relative to an end of a transaction, a count can be initialized to a value determined as count=ceil(pipelinedelay/(Clock 2/Clock 1)), where Clock 2 is the clock of the domain reading from ("sinking") the FIFOs, Clock 1 is the clock for the domain writing to ("sourcing") the FIFOs.

If Clock 2 is less than Clock 1, no extra delay is required, so a minimum value for count can be zero. Otherwise, count can be rounded up to the nearest integer (ceiling). Because the pipe delay is equivalent to the availability of the last data element in this example, a different statement of the count initialization value is that the count is initialized by determining when the last data element is available, compared with availability of the corresponding control, and then dividing that difference by an appropriate clock ratio. In summary, a delay is introduced if a circuit reading from a FIFO is clocked at a faster rate than a circuit writing to that FIFO. An amount of delay is determined so that the control is read at a time selected to respect the offset between control and data in the pipeline of which the circuits are a part, but also avoiding unnecessary delay.

Figure 7:
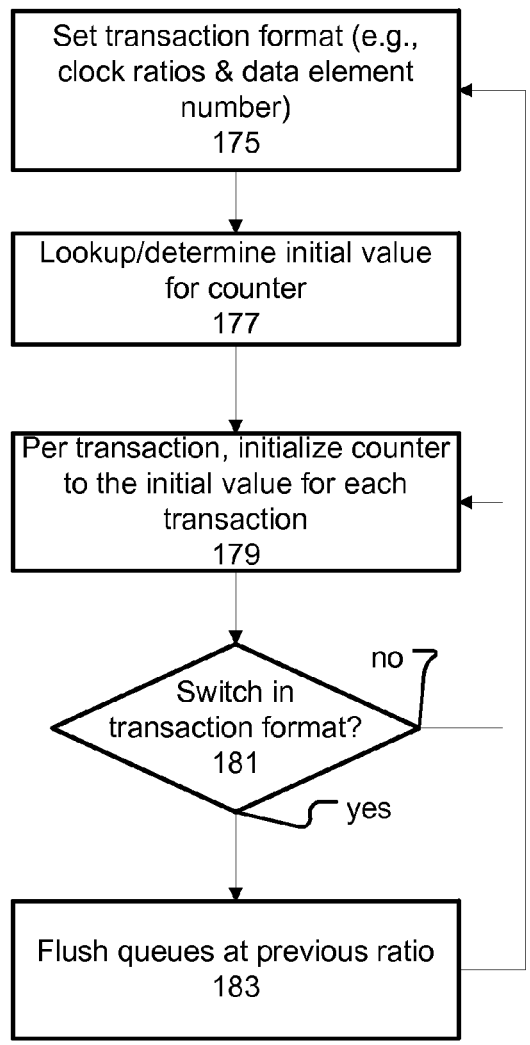
FIG. 7 depicts a process by which changes in transaction format (e.g., to clock ratio) causes a change to the initial value of the counters that are instantiated for transactions.

FIG. 7 depicts an example process in which a current transaction format may be set and subsequently changed. FIG. 7 depicts an example in which an apparatus has modules clocked with clocks that have a given clock ratio, and thus a decision or command is made to adjust one or more of these clocks, which changes a clock ratio of these modules.

At 175, a transaction formation is set; this action may take place at an initialization phase or in response to a clock ratio change command. Since the transaction format is changing, a clock ratio selection or change may need to be made. In response, at 177, a lookup or calculation of an appropriate initial value for counters is conducted. For example, all supportable clock ratios and data formats can have pre-calculated counter values, which are stored. For example, clock ratio control module 30 may perform a lookup in table 31 (see FIG. 1). In some implementations, these counter values can be determined by circuitry, or by control software. For example, a power management process can determine clocking frequencies for multiple modules, and a bus transaction format, and then calculate the initial counter value accordingly. Such counter value also can be set based on how the counter value will be updated, and those of ordinary skill would understand from this disclosure that the counter value is initialized based on an expectation of how it would be updated.

At 179, a counter is initialized for each data transfer to be performed. Such initialization occurs in response to a module outputting a data element or otherwise initiating a data transfer. Such initialization thus would occur at each interface implementing the disclosure. As such, a variety of counters may be set across a system with a number of interconnected functional modules, as these different functional modules exchange data. At 181, a switch in transaction format is detected. This detection does not indicate that the interface has been switched to a different format, but rather there is an indication that a switch is to be effected. Then, at 183, data existing in the FIFOs at interfaces of the modules affected by the switch are flushed at the old transaction format. Such flushing would allow the counter updating to proceed as normal and continue to read data from the FIFOs as normal. In some cases, queues across an entire system can be flushed when there is a transaction format change, while in other cases, only queues for affected interfaces may be flushed. Which queues need to be flushed and which do not will be affected by how different modules in the system are clocked. After flushing, then the new transaction format can be set, at 175, and the system can continue operation at the new transaction format.

Also, the example of FIG. 1 showed that the count was initialized and decremented within the circuitry clocked by clock 15. However, in other implementations, a current ratio between clock 15 and 16 may be available to the circuitry clocked by clock 16. That ratio may be used, in conjunction with the pre-set pipeline offset, and CtrlWrEn 52 or CtrlFifoEmpty 53 to initiate a counter by circuitry clocked by clock 16. It was explained above that the counter initial value can be determined by software. Such initial value can be loaded into a register for example by software and then copied when data element-specific counters need to be initialized. In implementations according to this disclosure, the counter can be initialized to a different value, but because of a difference in clocking frequency, would ultimately trigger CtrlRdEn 63 at the same time.

It was disclosed herein that a counter is provided for each transaction at a given interface. Each counter can be maintained within a respective register. Each counter is initialized and updated, such that when a given counter reaches a pre-determined value, a transaction associated with that counter is ready to proceed. Each counter can be associated with a fixed position in memory that is managed as a ring buffer, such that a pointer or index may be maintained to a location in such ring buffer at which control and data will be stored for a next transaction.

From the above disclosure, a person of ordinary skill would appreciate that a variety of implementations of the disclosed aspects can be realized. For example, FIG. 1 depicts count maintenance 22 and read enable 24 as separate blocks. However, these functional elements can be realized by the same portion of circuitry, and count maintenance 22 can update each counter and perform a comparison. Also, the counter for each item in a given queue may be updated by a clock for a storing unit, a clock for a reading unit, by a third clock, or other update mechanism that is designed to account for a data transaction format being used to exchange data between the storing unit and the reading unit. As such, it would be understood that embodiments of the disclosure may implement a self-consistent mechanism for initializing each counter, updating each counter and determining when the counter indicates that the item of control may be read. This reading in turn triggers a self-consistent mechanism for determining when the item of data is to be read. These examples also described a situation where control lead data for a given transaction by some number of clocking events. Although this is expected to be the typical case, embodiments of the disclosure apply also to a situation where data may lead control. It would be understood from these various examples that other implementations of such functionality can be realized by those of ordinary skill based on this disclosure.

The term "clock event" was used to encompass any of a variety of approaches to clocking circuitry, and the example does not imply or require the usage of any particular clocking approach. For example, if circuitry is configured to be double-edge sensitive, then occur clock events on both transitions, while for a single-edge clocking approach, a clock event occurs for each clock period. Also, where the term clock frequency was used, it is used in the sense of a rate of clock events, which do not necessarily correspond exactly to a number of state transitions of a clock per second.

Control FIFO 11 and Data FIFO 12 can be implemented using a variety of techniques. For example, each FIFO can be implemented using in a memory shared for other purposes and by other functional units. For example, each FIFO can be implemented as a ring buffer that tracks a head address and a tail of address of entries currently in that FIFO. These FIFOS can be implemented using a dedicated set of registers. Also, FIG. 1 depicts a separate control FIFO 11 and data FIFO 12; however, this separate depiction does not imply physical separation, and indeed, the same physical memory can be used to implement both such FIFOs. A FIFO is an example of a queue. Although not a principal focus of the disclosure, implementations may select pairings of control and data out of first in/first out order, so long as the relative pipeline offset for each pairing of control and data is maintained. Similarly, a variety of physical implementations of functionality to initialize, update and determine when each counter indicates control readiness can be realized, such physical implementations would be influenced by the particulars of the system in which this functionality would be realized.

Aspects of functions, and methods described and/or claimed may be implemented in a special purpose or general-purpose computer including computer hardware, as discussed in greater detail below. Various functionality can be provided in customized FPGAs or ASICs or other configurable processors. Such processing functionality may be used in personal computers, desktop computers, laptop computers, message processors, hand-held devices, multi-processor systems, microprocessor-based or programmable consumer electronics, game consoles, network PCs, mini-computers, mainframe computers, mobile telephones, PDAs, tablets, embedded applications, such as televisions, automobiles, sensors, robots, and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in a machine usable medium including non-transitory memories such as memories using semiconductor, magnetic disk, optical disk, ferrous, resistive memory, flash memory, and so on. Such machine readable information can be accessed over networks from network attached storage, from storage area networks, from remote file servers, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. Examples of HDLs include Verilog HDL and VHSIC Hardware Description Language, where VHSIC stands for is Very High Speed Integrated Circuit. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Machine-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Although some subject matter may have been described in language specific to examples of structural features and/or method steps, it is to be understood that the subject matter defined in the appended claims is not necessarily limited to these described features or acts. Rather, the described features and steps are disclosed as examples of components of systems and methods within the scope of the appended claims.

The embodiments herein have been described above with the aid of functional building blocks illustrating the implementation of specified functions and relationships thereof. The boundaries of these functional building blocks have been defined in the disclosure for disclosure of exemplary implementations, and for the convenience of the description. Alternate boundaries may be defined so long as the specified functions and relationships thereof are appropriately performed.

For sake of clarity, not every example can include an implementation of every aspect disclosed herein, and the examples do not illustrate exclusive or entirely complete functional units or integrated circuits according to the disclosure, but rather are to be interpreted and understood in light of the knowledge of those of ordinary skill. Instead, aspects illustrated and described with respect to one figure or example can be used or combined with aspects illustrated and described with respect to other figures, and can be combined with, used with, or implemented with other functionality. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. An integrated circuit, comprising:
   a first circuit clocked by a first clock;
   a second circuit clocked by a second clock, wherein the second clock and the first clock are configured to operate at different frequencies;
   a control queue coupled to receive an element of control information outputted from the first circuit, and to be read by the second circuit;
   a data queue coupled to receive an element of data outputted from the first circuit, wherein the element of control information and element of data are pipelined and offset from each other by a pre-set number of clock events of the first clock; and
   a counter operable to be initialized to an initial value and to be updated during subsequent clocking;
   wherein the second circuit is configured to read the element of control information from the control queue responsive to the value of the counter reaching a pre-determined value, and to read the element of data from the data queue after the pre-set number of clock events have occurred for the second clock after the control information is read.

2. An integrated circuit as claimed in claim 1, wherein the counter is updated based on the first clock; and the initial value to which the counter is initialised is determined based on a delay between when the element of control information can be read from the control queue and when a final element of data will be available to be read from the data queue, and a ratio between the second clock and the first clock.

3. An integrated circuit as claimed in claim 1, wherein the counter is updated based on the second clock; and the initial value to which the counter is initialised is determined based on a delay between when the element of control information can be read from the control queue, and when a final element of data will be available to be read from the data queue, and a ratio between the first clock and the second clock.

4. An integrated circuit as claimed in claim 1, wherein the first circuit is operable to store multiple data elements in the data queue for each element of control information stored in the control queue; and the initial value to which the counter is initialised is determined based on when the element of control information can be read from the control queue and when a final element of data will be available to be read from the data queue, divided by a ratio between the second clock and the first clock.

5. An integrated circuit as claimed in claim 1, wherein each of the control queue and data queue are First In First Out (FIFO).

6. An integrated circuit as claimed in claim 1, wherein the counter is operable to be initialised to an initial value determined according to a ratio of the first clock and the second clock and the pre-set number of clock events.

7. An integrated circuit as claimed in claim 1, wherein the counter is decremented for each clock event of the first clock.

8. An integrated circuit as claimed in claim 1, wherein the counter is operable to be initialised to an initial value selected so that after the pre-set number if clock events have occurred for the second clock after the control information is read, the counter is zero.

9. An integrated circuit as claimed in claim 1, wherein the frequency of the second clock is not greater than the frequency of the first clock and the counter is operable to be initialised to an initial value of zero.

10. An integrated circuit as claimed in claim 1, wherein the circuit further comprises a respective counter for each element of control information in the control queue.

11. An integrated circuit as claimed in claim 1, wherein a minimum initial value of the counter is zero.

12. An integrated circuit as claimed in claim 1, wherein the counter is configured to generate a signal supplied to the second circuit when the counter reaches the pre-determined value.

13. A non-transitory machine-readable medium having stored thereon a machine readable dataset description of a machine, that when processed, causes a layout processing system to generate a circuit layout description used to manufacture an integrated circuit comprising:
   a first circuit configured to be clocked by a first clock, the first circuit operable to operate at a first frequency to:
      store an element of control information in a control queue; and
      store an element of data in a data queue. after a pipeline delay characterized by a pre-set number of clock events of the first clock;
   a second circuit configured to be clocked by a second clock, and operable to operate at a different frequency than said first frequency; and
   a counter operable to be initialised to an initial value and to be updated during subsequent clocking;
   wherein the second circuit is configured to read the element of control information from the control queue responsive to the value of the counter reaching a pre-determined value, and to read the element of data from the data queue after the pre-set number of clock events have occurred for the second clock after the control information is read.

14. A non-transitory machine-readable medium as claimed in claim 13, wherein the machine-readable data is in Verilog HDL format, or in VHSIC Hardware Description Language.

15. A non-transitory computer-readable medium having stored thereon computer executable instructions, which when executed cause at least one processor to:
    store an element of control information in a control queue according to a first clock operating at a first frequency;
    store an element of data in a data queue, after a pipeline delay characterized by a pre-set number of clock events of the first clock;
    initialise a counter to an initial value;
    update the counter with clock events; and
    responsive to the counter reaching a pre-determined value, read the element of control information from the control queue according to a second clock, operating at a second frequency different than said first frequency, and then read the element of data from the data queue after the pre-set number of clock events have occurred for the second clock.

\* \* \* \* \*